United States Patent [19]

Aihara et al.

[11] 4,436,849

[45] Mar. 13, 1984

[54] AQUEOUS RESIN COMPOSITION

[75] Inventors: Tetsuo Aihara; Yasuharu Nakayama; Koichi Umeyama; Kozo Sawada; Masaaki Shinohara, all of Hiratsuka, Japan

[73] Assignee: Kansai Paint Company, Limited, Hyogo, Japan

[21] Appl. No.: 431,080

[22] Filed: Sep. 30, 1982

[30] Foreign Application Priority Data

Oct. 26, 1981 [JP] Japan .................................. 56-171115
Dec. 18, 1981 [JP] Japan .................................. 56-203430

[51] Int. Cl.$^3$ .......................... C08L 67/08; C09D 3/68
[52] U.S. Cl. ..................................... 523/501; 106/252; 106/264; 260/404; 260/404.5; 260/404.8; 523/500
[58] Field of Search ................ 523/500, 501; 106/252, 106/264; 260/404, 404.5, 404.8

[56] References Cited

U.S. PATENT DOCUMENTS 4,072,536 2/1978 Otsuki et al. ........................ 106/252
4,097,298 6/1978 Haeufler et al. .................... 106/252
4,301,048 11/1981 Hirayama et al. .................. 106/252

*Primary Examiner*—Ronald W. Griffin

*Attorney, Agent, or Firm*—Wenderoth, Lind & Ponack

[57] ABSTRACT

An aqueous resin composition comprising a neutralization product of an isocyanurate group-containing maleinized alkyd resin having an acid value of 5 to 65 in an aqueous medium, said maleinized alkyd resin being prepared by maleinizing an alkyd resin having an acid value of not more than 10 and a hydroxyl value of not more than 10 which is the product of condensation reaction of (A) 20 to 60% by weight of at least one of drying or semi-drying oils and fatty acids, (B) 10 to 45% by weight of at least one tris(hydroxyalkyl) isocyanurate, (C) 0 to 45% by weight of at least one polyhydric alcohol other than the component (B), (D) 10 to 45% by weight of at least one polybasic acid, and (E) 0 to 15% by weight of at least one monobasic acid and an aqueous emulsion resin composition obtained by emulsion polymerization of a radical polymerizable unsaturated monomer in an aqueous medium in the presence of the aforesaid neutralization product. The above aqueous resin compositions can give a coating having excellent corrosion resistance and fast-drying property.

49 Claims, No Drawings

AQUEOUS RESIN COMPOSITION

This invention relates to an aqueous resin composition, and more specifically, to an aqueous resin composition containing an isocyanurate group-containing maleinized alkyd resin which can give a coating having excellent corrosion resistance and fast-drying property.

Alkyd resins have been used in quantities from old as resins for air-drying paints, and it is well known that they are also useful as primers for inhibiting corrosion. Nowadays, the properties (e.g., drying property, corrosion resistance, etc.) required of coated films are on a higher level, and it is desired to develop alkyd resins having excellent corrosion-inhibiting ability without adding a hazardous rust preventive pigment such as strontium chromate.

We therefore extensively worked on alkyd resins which would meet the above requirements. Our work led to the discovery that the corrosion resistance of an alkyd resin can be improved by imparting a moderate degree of basicity to it, and its drying property (curability) can be improved by strenghthening its intramolecular cohesive force. As an alkyd resin which simultaneously meets these requirements of basicity and intramolecular cohesive force, we discovered an alkyd resin containing large amounts of isocyanurate groups. This resin formed a coated film having excellent corrosion resistance without using a rust preventive pigment, but we furthered our investigation to determine the possibility of using the isocyanurate group-containing alkyd resin as a vehicle for a water-base paint containing little or no organic solvent so as to make it pollution-free and also to save resources.

As the most general method, we prepared a water-solubilized alkyd resin by imparting an acid value to the main skeleton of the resin by condensing an isocyanurate group-containing monomer, such as tris(2-hydroxyethyl)isocyanurate, as a polyhydric alcohol component with a polybasic acid such as phthalic acid and trimellitic anhydride, and examined its corrosion resistance. The corrosion resistance of this resin, however, was found to be insufficient.

There is known a resin composition obtained by neutralizing an alkyd resin having an isocyanurate group-containing compound as a polyhydric alcohol component, and dispersing it in water (Japanese Laid-Open Patent Publication No. 41221/1981). Since the alkyd resin used in the above resin composition is prepared by using polyoxyethylene glycol having a molecular weight of 600 to 20,000, a coated film prepared from the resin composition has poor water resistance and is difficult to use as an air drying paint. Furthermore, since the carboxyl group and the isocyanurate group showing basicity both exist close to each other in the main skeleton of the resin, they effect each other, and the properties of the two groups cannot be exhibited fully. Hence, the resulting resin composition has insufficient water dispersibility, curability and corrosion resistance in practical application.

In view of the aforesaid state of the art, we made investigations about a method of rendering an isocyanurate group-containing alkyd resin aqueous without impairing the improved properties (corrosion resistance and curability) attributed to the isocyanurate group which imparts basicity to the resin and has a strong intramolecular cohesive force and while maintaining the water resistance and other properties at practical levels. These investigations had led to the discovery that the best method of achieving it is to impart the desired acid value to an alkyd resin by maleinizing the fatty acid group in the alkyd resin.

According to this invention, there is provided an aqueous resin composition comprising a neutralization product of an isocyanurate group-containing maleinized alkyd resin having an acid value of 5 to 65 in an aqueous medium, said maleinized alkyd resin being prepared by maleinizing an alkyd resin having an acid value of not more than 10 and a hydroxyl value of not more than 10 which is the product of condensation reaction of (A) 20 to 60% by weight of at least one of drying or semi-drying oils and fatty acids, (B) 10 to 45% by weight of at least one tris(hydroxyalkyl) isocyanurate, (C) 0 to 45% by weight of at least one polyhydric alcohol other than the component (B), (D) 10 to 45% by weight of at least one polybasic acid, and (E) 0 to 15% by weight of at least one monobasic acid.

In the alkyd resin provided by this invention, the carboxyl groups introduced by maleinization add to the fatty acid moiety having strong oiliness. Hence, in a dried coated film, the carboxyl groups are surrounded by oily groups and spaced from the isocyanurate group located at the main chain of the skeleton of the alkyd resin. consequently, the alkyd resin can be dissolved or dispersed in an aqueous medium without adverse effects exerted by the isocyanurate group which exhibit weak basicity. On the other hand, the isocyanurate groups can exhibit the aforesaid properties without being adversely affected by the carboxyl groups. Furthermore since the fatty acid and the maleic anhydride in the alkyd resin in accordance with this invention are bonded through a C—C bond, it has resistance to hydrolysis and is easily dissolved or dispersed in the aqueous medium.

The isocyanurate group-containing maleinized alkyd resin used in this invention is characterized in that it has an acid value as a result of maleinizing the fatty acid group of an alkyd resin having an isocyanurate group at the main chain. To obtain such a maleinized alkyd resin, the starting alkyd resin should have a relatively low content of hydroxyl and carboxyl groups. If the starting alkyd resin to be maleinized contains much hydroxyl groups in the main skeleton, the hydroxyl groups would react with maleic acid during maleinization to form a half ester and thus to introduce the carboxyl group into the main skeleton of the alkyd resin. As a result, the resulting maleinized alkyd resin would be susceptible to hydrolysis by the so-called anchimeric effect (see J. Paint Technol., 47, No. 602, 40, 1975) and have poor stability.

In the present invention, an alkyd resin having an acid value of not more than 10, preferably not more than 7, and a hydroxyl value of not more than 10, preferably not more than 7, is used as a starting resin to be maleinized. If the acid value and hydroxyl value exceed 10, the properties (the improvement of corrosion resistance and curability, etc.) of the isocyanurate group cannot be exhibited for the reason mentioned above. In order to limit the acid value and hydroxyl value of the alkyd resin to the above range, the components (A) to (E) should be preferably reacted so that the ratio of the number of hydroxyl groups to that of carboxyl groups is adjusted to from 1.10:1.0 to 1.0:1.10, preferably from 1.05:1.0 to 1.0:1.05.

The components (A) to (E) which constitute the alkyd resin to be maleinized will be described below.

The component (A) is at least one fatty component selected from the group consisting of drying fatty oils, semidrying fatty oils, drying fatty acids and semidrying fatty acids. Generally, these fatty components are animal and vegetable oils and monobasic acids derived therefrom. Drying fatty oils and acids generally have an iodine value of at least 130, and semidrying fatty oils and acids usually have an iodine value of 100 to 130. Typical examples of such fatty oils and acids include drying oils or semidrying oils such as linseed oil, safflower oil, soybean oil, sesame oil, poppy oil, perilla oil, hemp seed oil, grape kernel oil, corn oil, tall oil, sunflower oil, cotton seed oil, walnut oil, rubber seed oil, tung oil, oiticica oil and dehydrated castor oil; and fatty acids and "Hidiene" fatty acids derived from these oils. These materials may be used singly or as a mixture of two or more. It is preferred to use linseed oil, soybean oil, soybean oil fatty acid and linseed oil fatty acid which can be easily maleinized and have good dispersibility in water.

In view of the ease of maleinization and the drying and curing properties of the resulting coated film, the amount of the component used is 20 to 60% by weight, preferably 30 to 50% by weight, more preferably 35 to 50% by weight, based on the total amount of the components (A) to (E). If the amount of the component (A) is less than 20% by weight, a coated film formed from the final aqueous resin composition has reduced water resistance and corrosion resistance. On the other hand, if it is larger than 60% by weight, the hardness and corrosion resistance of the coated film are reduced.

The component (B) is a tris(hydroxyalkyl)isocyanurate which is a component for introducing the isocyanurate group into the alkyd resin. Examples of usable tris(hydroxyalkyl)isocyanurates are tris(2-hydroxyethyl)isocyanurate and tris(hydroxymethyl)isocyanurate. They may be used either singly or in combination. The amount of the component (B) is 10 to 45% by weight, preferably 15 to 40% by weight, more preferably 20 to 35% by weight, based on the total amount of the components (A) to (E). If the amount of the component (B) is less than 10% by weight, a coated film formed from the final aqueous resin composition shows no appreciable improvement in corrosion resistance and curability. If it exceeds 45% by weight, the water resistance of the coated film is reduced.

The component (C) is a polyhydric alcohol other than the component (B). It may include those which are usually employed in the production of alkyd resins. Generally, mainly aliphatic polyhydric alcohols containing 2 to 6, preferably 2 to 4, hydroxyl groups and preferably 2 to 10 carbon atoms per molecule can be advantageously used. Specific examples include ethylene glycol, propylene glycol, butanediol, diethylene glycol, pentanediol, neopentyl glycol, glycerol, trimethylolethane, trimethylolpropane, pentaerythritol, sorbitol, 1,4-cyclohexanedimethanol and tricyclodecane dimethanol. They may be used singly or in combination. The use of 1,4-cyclohexane dimethanol, tricyclodecane dimethanol and pentaerythritol is preferred because such polyhydric alcohols can give a rigid resin.

The amount of the component (C) is 0 to 45% by weight, preferably 1 to 20% by weight, especially preferably 3 to 15% by weight, based on the total amount of the components (A) to (E).

The component (D) is any polybasic acid which is usually employed in the production of alkyd resins. Generally, mainly aliphatic or aromatic polycarboxylic acids containing 2 to 4, preferably 2 to 3, carboxyl groups and preferably 6 to 10 carbon atoms per molecule can be used advantageously. Specific examples include aromatic polycarboxylic acids such as phthalic acid, isophthalic acid, terephthalic acid, trimellitic acid, and pyromellitic acid; tetrahydrophthalic acid; aliphatic polycarboxylic acids such as succinic acid, adipic acid, sebacic acid, azelaic acid, 3,6-endomethylene, tetrahydrophthalic acid, and methylcyclohexenetricarboxylic acid; and anhydrides of these polycarboxylic acids. Of these, isophthalic acid and terephthalic acid are preferred. In combination with the isocyanurate compound (B), the component (D) serves to give an aqueous resin composition having markedly improved water dispersibility and film properties (particularly, flexibility).

The amount of the component (D) is 10 to 40% by weight, preferably 15 to 30% by weight, based on the total amount of the components (A) to (E).

The component (E) is a monobasic acid other than the fatty acids described hereinabove as the component (A). Specifically, there can be cited any monobasic acids which are usually employed in the production of alkyd resins, such as benzoic acid, p-tert-butylbenzoic acid, methylbenzoic acid, and non-drying oil fatty acids (e.g., coconut oil fatty acid, and olive oil fatty acid). Benzoic acid is especially preferred because of its low price. The amount of the component (E) is 0 to 15% by weight, preferably 1 to 8% by weight, based on the total amount of the components (A) to (E).

PREPARATION OF AN ISOCYANURATE GROUP-CONTAINING ALKYD RESIN

An alkyd resin can be produced from the components (A) to (E) [the components (C) and/or (E) are optional components] in a manner known per se. For example, the components (A) to (E) may be dehydrocondensed at about 150° to 250° C. for a about 3 to about 10 hours in an atmosphere of an inert gas such as nitrogen in the absence or presence of a suitable solvent such as an aromatic hydrocarbon (e.g., benzene, toluene and xylene) and optionally in the presence of a condensation catalyst such as dibutyltin oxide, zinc acetate and sulfuric acid.

The resulting alkyd resin desirably has an acid value and a hydroxyl value both of not more than 10, preferably not more than 7. If the acid value and/or the hydroxy value becomes higher than 10, the aforesaid properties of the component (B) may not be exhibited fully.

In order to control the acid value and the hydroxy value of the resulting alkyd resin within the aforesaid range, it is convenient to blend the components (A) to (E) such that the ratio of the total number of hydroxyl groups to that of carboxyl groups is adjusted to from 1.10:1.0 to 1.1:1.10, preferably from 1.05:1.0 to 1.0:1.05.

MALEINIZATION OF THE ALKYD RESIN

According to this invention, the resulting isocyanurate group-containing alkyd resin is then maleinized. Maleinization is carried out by the addition of maleic anhydride to the fatty acid group in the alkyd resin. Specifically, a mixture of the alkyd resin and maleic anhydride is reacted at about 150° to about 230° C. for about 1 to 5 hours in the absence or presence of a suitable solvent, such as an aromatic hydrocarbon solvent (e.g., benzene, xylene or toluene).

The degree of maleinization is adjusted so that the acid value of the maleinized alkyd resin (this denotes the acid value in the state in which the acid anhydride group is ring-opened) is within the range of 5 to 65, preferably 10 to 50, more preferably 15 to 45. If the acid value exceeds 65, a coated film formed from the finally obtained aqueous resin composition has reduced water resistance and weatherability. On the other hand, if the acid value is lower than 5, the maleinized alkyd resin has poor solubility or dispersibility in water.

In order to confine the acid value of the resulting maleinized alkyd resin within the above range, it is preferred that 5 to 55 parts by weight, preferably 10 to 42 parts by weight, of maleic anhydride be used per 1,000 parts by weight of the alkyd resin.

The resulting maleinized alkyd resin has a number average molecular weight of generally in the range of about 800 to about 100,000, especially preferably about 1000 to about 30,000.

According to this invention, the isocyanurate group-containing maleinized alkyd resin prepared in the above-described manner is then converted into a form soluble or dispersable in an aqueous medium by neutralizing it with a basic substance selected from ammonia and amines.

Illustrative of the amine used for neutralization are tri(lower alkyl)amines such as trimethylamine, triethylamine and tripropylamine; di(lower alkyl)amines such as dimethylamine and diethylamine; and di(lower alkyl)(lower alkanol)amines such as 2-dimethylaminoethanol and 2-diethylaminoethanol.

The aqueous medium used to dissolve or disperse the neutralized alkyd resin may be water or a mixture of water with a water-miscible organic solvent. Examples of the water-miscible organic solvent include Cellosolve-type solvents of the general formula HO—CH$_2$CH$_2$—OR$_1$ in which R$_1$ represents a hydrogen atom or an alkyl group having 1 to 8 carbon atoms, such as ethylene glycol, butyl Cellosolve and ethyl Cellosolve; carbitol-type solvents of the general formula HO—CH$_2$CH$_2$—OCH$_2$—CH$_2$—OR$_2$ wherein R$_2$ is the same as R$_1$, such as diethylene glycol, methyl carbitol and butyl carbitol; glyme-type solvents of the general formula R$_3$—O—CH$_2$CH$_2$—OR$_4$ wherein R$_3$ and R$_4$ each represent an alkyl group having 1 to 3 carbon atoms, such as ethylene glycol dimethyl ether; diglyme-type solvents of the general formula R$_5$O—CH$_2$CH$_2$OCH$_2$—CH$_2$OR$_6$ wherein R$_5$ and R$_6$ are the same as R$_3$ and R$_4$, such as diethylene glycol dimethyl ether; Cellosolve acetate-type solvents of the general formula R$_7$O—CH$_2$CH$_2$OCO—CH$_3$ wherein R$_7$ represents a hydrogen atom or a methyl or ethyl group, such as ethylene glycol monoacetate and methyl Cellosolve acetate; alcohol-type solvents of the general formula R$_8$OH wherein R$_8$ represents an alkyl group having 1 to 4 carbon atoms, such as ethanol and propanol; and diacetone alcohol, dioxane, tetrahydrofuran, acetone, dimethylformamide and 3-methoxy-3-methylbutanol. These organic solvents may be used singly or as a combination of two or more. The amount of the organic solvent is preferably not more than 100 parts by weight per 100 parts by weight of the maleinized alkyd resin used in this invention, and is less than the amount of water. Specifically, it can be used in an amount of not more than 100 parts by weight, preferably not more than 80 parts by weight, per 100 parts by weight of water.

Preferably, the maleinized alkyd resin in this invention is present in this aqueous medium in a solids concentration of about 5 to about 60% by weight, especially 10 to 50% by weight.

The resulting aqueous resin composition of this invention can be used advantageously as a coating composition by incorporating extender pigments, coloring pigments, dryers, rustproofing agents, ultraviolet absorbers, antifoamers, etc. which are normally used as paint additives.

A coated film prepared from the aqueous resin composition of this invention cures fully at room temperature. But when it is heated in the presence or absence of an amino resin, etc., it cures to a film of good quality within a shorter period of time.

It has further been found in accordance with this invention that when a radical-polymerizable unsaturated monomer is emulsion-polymerized in the presence of the aqueous resin composition of this invention used as a dispersion stabilizer, there can be obtained an aqueous emulsion resin composition which can give a coated film having very good properties such as further improved drying property and water resistance.

Thus, according to this invention, there is also provided an aqueous emulsion resin composition obtained by emulsion polymerization of a radical polymerizable unsaturated monomer in the presence of a water-solubilized or water-dispersed product of the neutralization product of the aforesaid isocyanurate group-containing maleinized alkyd resin.

Since the isocyanurate group-containing maleinized alkyd resin has a great grafting effect, it induces excessive grafting reaction with the radical-polymerizable unsaturated monomer during the emulsion polymerization to form a grafted product of the maleinized alkyd resin. At the same time, the radical polymerizable unsaturated monomer itself is emulsion-polymerized to form polymer particles.

The resulting aqueous emulsion resin composition is characterized by having excellent corrosion resistance attributed to the inclusion of the basic isocyanurate group in the main skeleton of the maleinized alkyd resin used as a dispersion stabilizer, and hardness and excellent drying property attributed to the presence of the grafted product of the maleinized alkyd resin. Furthermore, unlike a conventional water-soluble alkyd resin of the trimellitic acid or phthalic anhydride added type, the maleinized alkyd resin has excellent stability to hydrolysis. Furthermore, since the maleic acid component addes to the fatty acid moiety having strong oiliness, and is present remote from the basic isocyanurate group, the water dispersibility of the resin composition is not impaired, and moreover, good dispersing property can be imparted to the grafted product of the maleinized alkyd resin formed by the polymerization of the radical polymerizable unsaturated monomer. Accordingly, the aqueous emulsion resin composition prepared from it has very good stability.

Suitable radical polymerizable unsaturated monomers used for the synthesis of the grafted product of the maleinized alkyd resin are those monomers whose hydrophilicity is not so strong as is not in general emulsion polymerization.

The oxidation-curable groups contained in the maleinized alkyd resin are liable to undergo radical chain transfer and tends to reduce the molecular weight of the resin particles. In order, therefore, to strengthen the inside of the resin particles and to improve the film properties, it is preferred to use a polyfunctional unsaturated monomer as at least a part of the radical polymerizable unsaturated monomer.

The radical polymerizable unsaturated monomer generally has a Q value, determined by the Q-e theory, of at least 0.1, and can be selected broadly according to the properties required of the final aqueous emulsion resin composition. Unsaturated monomers having a Q value of 0.3 to 5 are especially suitable.

Typical examples of the radical polymerizable unsaturated monomers are shown below.

(a) Vinyl aromatic compounds

Styrene, α-methylstyrene, vinyltoluene, p-chlorostyrene and vinylpyridine.

(b) Acrylic or methacrylic acid esters $C_{1-26}$ alkyl esters of acrylic or methacrylic acid, such as methyl, acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; addition condensation products between glycidyl acrylate or glycidyl methacrylate and $C_{2-26}$ carboxyl-containing compounds (e.g., acetic acid, propionic acid, oleic acid, stearic acid or lauric acid); $C_{2-12}$ alkoxyalkyl esters of acrylic or methacrylic acid, such as methoxybutyl acrylate, methoxybutyl methacrylate, methoxyethyl acrylate, methoxyethyl methacrylate, ethoxybutyl acrylate and ethoxybutyl methacrylate; $C_{2-8}$ hydroxyalkyl esters of acrylic or methacrylic acid, such as hydroxyethyl acrylate, hydroxyethyl methacrylate, hydroxypropyl acrylate, and hydroxypropyl methacrylate, or condensation products of these hydroxyalkyl esters with carboxyl-containing compounds having 2 to 26 carbon atoms; allyl acrylate and allyl methacrylate; mono- or di($C_{1-10}$ alkyl) aminoalkyl esters of acrylic or methacrylic acid, such as diethylaminoethyl acrylate, diethylaminoethyl methacrylate, methylaminoethyl acrylate and methylaminoethyl methacrylate; and $C_{5-12}$ alkenyloxyalkyl esters of acrylic or methacrylic acid, such as allyloxyethyl acrylate and allyloxyethyl methacrylate.

(c) Diolefin compounds

Diolefins having 2 to 8 carbon atoms, such as butadiene, isoprene and chloroprene.

(d) Amides of acrylic or methacrylic acid

Acrylamide, N-methylol acrylamide and N-butoxymethyl acrylamide.

(e) Other unsaturated monomers

Acrylonitrile, methacrylonitrile and methyl isopropenyl ketone.

These unsaturated monomers may be used singly or in combination with each other.

Among these unsaturated vinyl monomers, the vinyl aromatic compounds (a) and the acrylic or methacrylic esters (B) are especially suitable. Especially preferred unsaturated vinyl monomers are styrene, α-methylstyrene, vinyltoluene, and $C_{1-12}$ alkyl esters of acrylic or methacrylic acid.

The polyfunctional unsaturated monomer which can be used in combination with the radical polymerizable unsaturated monomer is a monomer having two or more non-conjugated double bonds in the molecule. Examples of the polyfunctional unsaturated monomer include esters formed between polyhydric alcohols having 2 to 4 functional groups and 2 to 10 carbon atoms (such as ethylene glycol, 1,6-hexanediol, trimethylolpropane and pentaerythritol) and acrylic or methacrylic acid; esters formed between glycidyl acrylate or glycidyl methacrylate and acrylic or methacrylic acid; esters between polycarboxylic acids having 2 to 4 functional groups and 6 to 10 carbon atoms (such as isophthalic acid, terephthalic acid, adipic acid and trimellitic acid) and glycidyl acrylate, glycidyl methacrylate, hydroxyethyl acrylate, hydroxyethyl methacrylate, hydroxypropyl acrylate or hydroxypropyl methacrylate; esters formed between polyepoxy compounds having 2 to 4 functional groups (such as bisphenol A diglycidyl ether) and hydroxyethyl acrylate, hydroxyethyl methacrylate, hydroxypropyl acrylate, hydroxypropyl methacrylate, acrylic acid or methacrylic acid; adducts formed between isocyanates having 2 to 4 functional groups and 2 to 12 carbon atoms (such as 1,6-hexamethylene diisocyanate, isophorone diisocyanate, lysine diisocyanate, xylylene diisocyanate and hydrogenated toluene diisocyanate) and hydroxyethyl acrylate, hydroxyethyl methacrylate, hydroxypropyl acrylate, hydroxypropyl methacrylate, acrylic acid or methacrylic acid; $C_{6-7}$ alkenyl esters of acrylic or methacrylic acid such as allyl acrylate and allyl methacrylate; esters formed between tris(2-hydroxyethyl)isocyanurate or tris(hydroxymethyl)isocyanurate and acrylic or methacrylic acid; adducts formed between tris(glycidyl)isocyanurate and acrylic or methacrylic acid; urethane compounds formed between polyisocyanate compound having 2 to 4 functional groups and hydroxyethyl acrylate, hydroxyethyl methacrylate, hydroxypropyl acrylate or hydroxypropyl methacrylate; esters formed between phosphoric acid and hydroxyethyl acrylate, hydroxyethyl methacrylate, hydroxypropyl acrylate or hydroxypropyl methacrylate; and divinylbenzene. There can also be used adducts formed between epoxy polymers having a number average molecular weight of not more than 2,000, preferably not more than 200 or acrylic or methacrylic polymers having hydroxyl, epoxy or carboxyl groups, and acrylic acid, methacrylic acid, glycidyl acrylate, glycidyl methacrylate, hydroxyethyl acrylate, hydroxyethyl methacrylate, hydroxypropyl acrylate or hydroxypropyl methacrylate.

Preferred among these polyfunctional unsaturated monomers are esters formed between polyhydric alcohols having 2 to 4 functional groups and 2 to 8 carbon atoms and acrylic or methacrylic acid; esters formed between glycidyl acrylate or glycidyl methacrylate and acrylic or methacrylic acid; and divinylbenzene.

The unsaturated monomers are properly selected according to the properties desired of the final aqueous emulsion resin composition, and may be used singly or as a combination of two or more.

Up to 50% by weight, preferably up to 30% by weight, of the aforesaid unsaturated monomer may be replaced by a hydrophilic unsaturated monomer. Examples of the hydrophilic unsaturated monomer that can be used in this invention include 2-hydroxyethyl acrylate, 2-hydroxyethyl methacrylate, 2-hydroxypropyl acrylate, 2-hydroxypropyl methacrylate, acrylonitrile, methacrylonitrile, acrylic acid, methacrylic acid, glycidyl acrylate, glycidyl methacrylate, acrylamide, N-n-butoxymethyl acrylamide, and vinylpyridine. These monomers may be used singly or in combination with each other.

The aqueous emulsion resin composition in accordance with this invention may be prepared by conventional known methods. For example, it can be prepared by well dispersing the radical polymerizable unsaturated monomer in a water-solubilized or water-dispersed product of the isocyanurate group-containing maleinized alkyd resin in the presence of an aqueous medium, and subjecting the dispersion to emulsion polymerization with or without stirring at a temperature below the boiling point of the aqueous medium, optionally using a polymerization initiator such as an azo compound, a peroxide, a or a redox system, or activated energy rays such as ultraviolet rays, gamma-rays and electron beams. A part of the resulting resin may be in the gelled state. But since this gellation occurs microscopically, it does not at all cause inconvenience to the formation of a coated film.

In the above reaction, the ratio of the maleinized alkyd resin to the radical polymerizable unsaturated monomer may be varied widely depending upon the type of the alkyd resin and/or the unsaturated monomer, etc. Usually it may be from 5:100 to 100:5, preferably from 10:100 to 100:10. As stated above, the polyfunctional unsaturated monomer can be used as at least a part of the radical polymerizable unsaturated monomer. The amount of the polyfunctional monomer is not more than 50% by weight of the total weight of the unsaturated monomers used. However when the ratio of the maleinized alkyd resin to the radical polymerizable unsaturated monomer is from 100:100 to 100:5 and the proportion of the unsaturated monomer is small, the unsaturated monomers may be wholly one or more polyfunctional monomers, and this is preferred in view of the properties of the resulting coated film.

The resulting aqueous emulsion resin composition of this invention can be used mainly as an air-drying type coat-forming material after adding conventional paint additives such as coloring agents, extender pigments, dryers, rust-proofing agents, ultraviolet absorbers and antifoamers, etc. and adjusting its solids concentration to, for example, 5 to 50% by weight. Needless to say, it can also be used as a baking-drying type coat forming material. It can also be used as a resin finishing agent.

The aqueous emulsion resin composition of this invention exhibits excellent performance by itself, but in order to improve its performance further, it may be used in admixture with another water-soluble or water-dispersible resin.

The following Examples and Comparative Examples illustrate the present invention in greater detail. All parts and percentages in these examples are by weight unless specifically indicated.

EXAMPLE 1

| | |
|---|---|
| Linseed oil fatty acid | 407 parts |
| tris(2-Hydroxyethyl) isocyanurate | 250 parts |
| 1,4-Cyclohexane dimethanol | 138 parts |
| iso-Phthalic acid | 245 parts |
| Benzoic acid | 47 parts |
| Dibutyltin oxide | 2 parts |
| Xylene | 30 parts |

The above ingredients were put in a reactor, and with stirring in an atmosphere of nitrogen, they were heated to 240° C. The reaction was carried out for 6.5 hours, until the acid value of the resin reached 5.5 (the hydroxyl value 5.4). Subsequently, the temperature was lowered to 200° C., and 25 parts of maleic anhydride was added to maleinize the alkyd resin at 200° C. for 2.5 hours. After the reaction, the reaction mixture was distilled under reduced pressure to remove the unreacted maleic anhydride and xylene, and then the temperature was lowered to 140° C. At this temperature, 15 parts of tap water was added to the reactor, and ring-opening reaction was carried out for 1 hour. Then, 330 parts of n-butyl Cellosolve was added. There was obtained a maleinized alkyd resin varnish having a heating residue of 75%, a resin acid value of 25.0, a Gardner viscosity(as a 60% n-butyl Cellosolve solution) of T to U, and a number average molecular weight of about 5,000.

The varnish was neutralized with 2.0 equivalents of triethylamine, and then dispersed in tap water.

The following pigments were added to 26.3 parts, as the resin solids, of the dispersion, and dispersed for 1 hour using a paint conditioner.

| | |
|---|---|
| Mapicoyellow XLO (a tradename for iron oxide made by Titanium Kogyo Co., Ltd.) | 26.3 parts |
| Talc No. 1 | 34.3 parts |
| Tancal No. 3000 a tradename for calcium carbonate made by Sakuhara Chemical Industry Co., Ltd.) | 34.3 parts |

To the resulting pigment dispersion was added another portion of the aforesaid neutralized resin solution which contained a dryer, and the weight ratio of the entire resin solids to the pigments was adjusted to 1.0:1.8. Then, while adding water, the mixture was stirred by a high-speed dispersing device. The dryer was cobalt naphthenate added in an amount of 0.05 part as metal based on 100 parts by weight of the resin solids.

EXAMPLE 2

| | |
|---|---|
| Linseed oil fatty acid | 407 parts |
| tris(2-Hydroxyethyl) isocyanurate | 250 parts |
| 1,4-Cyclohexane dimethanol | 138 parts |
| Terephthalic acid | 245 parts |
| Benzoic acid | 47 parts |
| Dibutyltin oxide | 2 parts |
| Xylene | 30 parts |

The above ingredients were put in a reactor and reacted for 7.0 hours and under the same conditions as in Example 1, until the acid value of the resin reached 6.9 (the hydroxyl value 6.5). Then, 25 parts of maleic anhydride was added, and the alkyd resin was maleinized under the same conditions as in Example 1. The reaction mixture was then distilled under reduced pressure to remove the unreacted maleic anhydride and xylene. Then, 15 parts of tap water was added, and the same ring-opening reaction as in Example 1 was carried out to give a maleinized alkyd resin varnish having a heating residue of 75%, a resin acid value of 30.2, a Gardner viscosity (as a 60% n-butyl Cellosolve solution) of U-V, and a number average molecular weight of about 5,500.

In the same way as in Example 1, the varnish was neutralized and pigments were further dispersed.

EXAMPLE 3

| | |
|---|---|
| Linseed oil fatty acid | 399 parts |
| tris(2-Hydroxyethyl) isocyanurate | 302 parts |
| 1,4-Cyclohexane dimethanol | 90 parts |
| iso-Phthalic acid | 228 parts |

| | |
|---|---|
| Benzoic acid | 67 parts |
| Dibutyltin oxide | 2 parts |
| Xylene | 30 parts |

The above ingredients were put in a reactor and reacted for 6.5 hours under the same conditions as in Example 1, until the acid value of the resin reached 6.1 (hydroxyl value 6.3). The temperature was then lowered to 200° C., and the resulting alkyd resin was maleinized at 200° C. for 2 hours. After the reaction, the reaction mixture was distilled under reduced pressure to remove the unreacted maleic anhydride and xylene. The residue was cooled to 140° C., and then 15 parts of tap water was added, and ring-opening reaction was carried out for 1 hour. Then, 330 parts of n-butyl Cellosolve was added to give a maleinized alkyd resin varnish having a heating residue of 74.9%, a resin acid value of 25.4, a Gardner viscosity (as a 60% n-butyl Cellosolve solution) of V and a number average molecular weight of about 4,500.

In the same way as in Example 1, the varnish was neutralized to form an aqueous dispersion, and pigments were dispersed.

COMPARATIVE EXAMPLE 1

| | |
|---|---|
| Linseed oil fatty acid | 396 parts |
| Pentaerythritol | 140 parts |
| 1,4-Cyclohexane dimethanol | 144 parts |
| iso-Phthalic acid | 248 parts |
| Benzoic acid | 178 parts |
| Dibutyltin oxide | 2 parts |
| Xylene | 30 parts |

The above ingredients were put in a reactor and reacted under the same conditions as in Example 1 for 7 hours, until the acid value of the resin reached 3.7. Then, 25 parts of maleic anhydride was added, and under the same conditions as in Example 1, the alkyd resin was maleinized. The reaction mixture was distilled under reduced pressure to remove the unreacted maleic anhydride and xylene. Tap water (15 parts) was added, and ring-opening reaction was carried out as in Example 1. Then, 330 parts of n-butyl Cellosolve was added to give a maleinized alkyd resin varnish having a heating residue of 75%, a resin acid value of 27.8, a Gardner viscosity (as a 60% n-butyl Cellosolve solution) of Y and a number average molecular weight of 5,000.

The resulting varnish was neutralized to form an aqueous dispersion, and pigments were dispersed, in the same way as in Example 1.

COMPARATIVE EXAMPLE 2

| | |
|---|---|
| Dehydrated castor oil fatty acid | 336 parts |
| tris(2-Hydroxyethyl) isocyanurate | 306 parts |
| Trimethylolethane | 88 parts |
| Neopentyl glycol | 15 parts |
| iso-Phthalic acid | 304 parts |
| Polyethylene glycol (molecular weight 6,000) | 51 parts |
| Xylene | 30 parts |

An alkyd resin having an acid value of 16 was prepared by reacting the above ingredients in a reactor under the same conditions as in Example 1 (the reaction time was 4.5 hours). Then, 330 parts of n-butyl Cellosolve was added to give an alkyd resin varnish having a heating residue of 75%, a resin acid value of 15.0, a Gardner viscosity (as a 60% n-butyl Cellosolve solution) of Z and a number average molecular weight of about 10,000.

In the same way as in Example 1, the varnish was neutralized to form an aqueous dispersion, and pigments were dispersed.

COMPARATIVE EXAMPLE 3

| | |
|---|---|
| Linseed oil fatty acid | 411 parts |
| tris(2-Hydroxyethyl) isocyanurate | 254 parts |
| 1,4-Cyclohexane dimethanol | 139 parts |
| iso-Phthalic acid | 266 parts |
| Benzoic acid | 19 parts |

The above ingredients were put in a reactor and reacted under the same conditions as in Example 1 to give an alkyd resin having an acid value of 15.8 (the reaction time was 4.5 hours). Then, 15 parts of maleic anhydride was added, and the alkyd resin was maleinized at 200° C. for 2.5 hours. After the maleinization, the reaction mixture was distilled under reduce pressure to remove the unreacted maleic anhydride and xylene. Then, 15 parts of tap water was added, and ring-opening reaction was carried out. Thirty parts of n-butyl Cellosolve was added to give a maleinized alkyd resin varnish having a heating residue of 75.1%, a resin acid value of 30.1, a Gardner viscosity (as a 60% n-butyl Cellosolve solution) of Z and a number average molecular weight of 5,500.

In the same way as in Example 1, the varnish was neutralized to form an aqueous dispersion, and pigments were dispersed.

TESTS FOR PROPERTIES AND THE RESULTS

Each of the pigment dispersion obtained in Examples the above Examples and Comparative Examples was coated by a bar coater on a mild steel sheet polished with a sand paper No. 320, and dried at 20° C. and a humidity of 75% for 7 days.

The properties of the coated films were tested and the results are shown in Table 1.

TABLE 1

| Film properties | | Example 1 | Example 2 | Example 3 | Comparative Example 1 | Comparative Example 2 | Comparative Example 3 |
|---|---|---|---|---|---|---|---|
| Film thickness after drying (microns) | | 32 | 33 | 33 | 34 | 33 | 32 |
| Pencil hardness (*1) | 1 day | 5B | 5B | 4B | 5B | 4B | 4B |
| | 3 days | 4B | 4B | 3B | 4B | 2B | 3B |
| | 7 days | HB | HB | HB | B | B | B |
| Adhesion test (*2) | | Good | Good | Good | Good | Good | Good |
| Water resistance (*3) | | Slightly whitened | Slightly whitened | Slightly whitened | Slightly whitened | Wholly blistered | Slightly whitened |

TABLE 1-continued

| Film properties | Example 1 | Example 2 | Example 3 | Comparative Example 1 | Comparative Example 2 | Comparative Example 3 |
|---|---|---|---|---|---|---|
| Salt spray resistance (*4) (from width of blister from the cut part) | 1.5 mm | 1.0 mm | 0.5 mm | 4.0 mm | Wholly blistered | 5.0 mm |

(*1): Film thickness
The coating was performed at a temperature of 20° C. and a humidity of 75%, and the hardness of the coated film after the lapse of 1, 3, and 7 days, respectively, was measured.
(*2): Adhesion test
One hundred squares each having an area of 1 mm² were provided on a test specimen by cross-cutting. An adhesive cellophane tape was applied to the cross-cut surface, and then violently peeled off.
(*3): Water resistance
The sample specimen was dipped in tap water at 20° C. for 2 days, and then the state of the coated film was examined.
(*4): Corrosion resistance The coated film was cross-cut by a razor edge so that the cuts reached the substrate. The specimen was then subjected to a salt spray tester for 120 hours, and the state of the coated surface of the specimen was examined (in accordance with JIS Z-2371).

EXAMPLE 4

The maleinized alkyd resin varnish (213 parts) obtained in the same way as in Example 1, 3 parts of n-butyl Cellosolve, 7.2 parts of triethylamine and 778 parts of tap water were stirred to form a solution. To the solution was added a solution of 1 g of ammonium persulfate in 20 parts of tap water. Then, a mixture of 404 parts of n-butyl methacrylate and 10 parts of 1,6-hexanediol diacrylate was added at a time, and the mixture was well stirred and heated to 80° C. The mixture was left to stand for 2 hours at this temperature to form an emulsion composition.

EXAMPLE 5

The same maleinized alkyd resin varnish (333 parts) as obtained in Example 1, 11.2 parts of triethylamine and 640 parts of tap water were stirred to form a solution. Then, a solution of 2.5 parts of azobisdimethylvaleronitrile in 50 parts of 1,6-hexanediol diacrylate was added, and the mixture was well stirred and heated to 80° C. The mixture was reacted at this temperature for 4 hours to form an emulsion composition.

EXAMPLE 6

The same maleinized alkyd resin varnish (213 parts) as in Example 2, 3 parts of n-butyl Cellosolve, 8.7 parts of triethylamine and 777 parts of tap water were stirred to form a solution. Then, to the solution was added a solution of 1 g of ammonium persulfate in 20 parts of tap water, and then, a mixture of 202 parts of n-butyl methacrylate, 202 parts of styrene, and 10 parts of 1,6-hexanediol dimethacrylate was added at a time. The mixture was stirred and heated to 80° C. It was left to stand at this temperature for 2 hours to form an emulsion composition.

EXAMPLE 7

The same maleinized alkyd resin varnish (333 parts) as in Example 2, 13.4 parts of triethylamine and 638 parts of tap water were well stirred to form a solution. Then, a solution of 2.5 parts of azobisdimethylvalenonitrile in 50 parts of trimethylolpropane triacrylate was dissolved in the resulting solution. The mixture was well stirred and heated to 80° C. The mixture was reacted at this temperature for 4 hours to form a microgel emulsion composition.

EXAMPLE 8

The same maleinized alkyd resin varnish (213 parts) as in Example 3, 7.2 parts of triethylamine and 778 parts of tap water were well stirred to form a solution. To the solution was added a solution of 1 g of ammonium persulfate in 20 parts of tap water. Thereafter, a mixture of 202 parts of styrene, 202 parts of 2-ethylhexyl methacrylate, and 10 parts of 1,6-hexanediol diacrylate was added at a time. The mixture was well stirred and heated to 80° C. It was then kept at this temperature for 2 hours to form an emulsion composition.

EXAMPLE 9

The same maleinized alkyd resin varnish (333 parts) as used in obtained in Example 3, 11.3 parts of triethylamine and 881 parts of tap water were well stirred to form a solution. To the solution was added a solution of 3.8 parts of azobisdimethylvaleronitrile in 75 parts of 1,6-hexanediol diacrylate. The mixture was well stirred, and heated to 80° C. It was reacted at this temperature for 4 hours to form a microgel emulsion composition.

COMPARATIVE EXAMPLE 4

160 parts of 1,2-vinyl maleinized polybutadiene having a number average molecular weight of about 3,000 and an acid value of 100, ring-opened with water, (the composition of polybutadiene: 1,2-linkage 91% by weight, 1,4-trans 9% by weight), 56 parts of n-butyl Cellosolve, 28 parts of triethylamine and 757 parts of tap water were well stirred to form a solution. To the solution was added a solution of 1 g of ammonium persulfate in 20 parts of tap water. Then, 414 parts of n-butyl methacrylate was added. They were well stirred and the mixture was heated to 80° C. It was left to stand at this temperature for 2 hours to form an emulsion composition.

COMPARATIVE EXAMPLE 5

| | |
|---|---|
| Styrene-allyl alcohol copolymer (molecular weight 1140; OH group content 7.5% by weight) | 547 parts |
| Linseed oil fatty acid | 635 parts |
| Xylene | 61 parts |
| Dibutyltin oxide | 1.1 parts |

The above ingredients were put in a reactor, and heated at 230° C. for 9 hours to perform esterification and give a resin having an acid value of 5.3 and a number average molecular weight of about 2,500. Then, 206 parts of maleic anhydride was added to the resin, and the mixture was heated at 200° C. for 3 hours. The reaction mixture was purified under reduced pressure, and 50 parts of water was added and the ring-opening reaction was performed at 100° C. for 2 hours, to give a resin varnish having an acid value of 133.

Then, 160 parts of the varnish, 56 parts of n-butyl Cellosolve, 36 parts of triethylamine and 749 parts of tap water were well stirred to form a solution. To the solution was added a solution of 1 g of ammonium persulfate in 20 parts of tap water. A mixture of 404 parts of n-butyl methacrylate and 10 parts of 1,6-hexanediol dimethacrylate was added at a time, and the mixture was well stirred and heated to 80° C. It was left to stand at this temperature for 2 hours to give an emulsion composition.

mixture was well stirred, and then heated to 80° C. The mixture was kept at this temperature for 2 hours to give an emulsion composition.

COMPARATIVE EXAMPLE 7

The maleinized alkyd varnish obtained in Comparative Example 6 (333 parts), 12.2 parts of triethylamine, and 639 parts of tap water were well stirred to form a solution. Then, a solution of 2.5 parts of azobisdimethylvaleronitrile in 50 parts of 1,6-hexanediol diacrylate was added. They were well stirred, and then heated to 80° C. The mixture was reacted at this temperature for 4 hours to give a microgel emulsion composition.

The properties of the emulsion compositions obtained in Examples 4 to 9 and Comparative Examples 4 to 7 are shown in Table 2.

TABLE 2

| | | Example 4 | Example 5 | Example 6 | Example 7 | Example 8 | Example 9 | Comparative Example 4 | Comparative Example 5 | Comparative Example 6 | Comparative Example 7 |
|---|---|---|---|---|---|---|---|---|---|---|---|
| Film properties after drying for 7 days (*5) | Film thickness (microns) | 32 | 34 | 34 | 33 | 35 | 33 | 34 | 36 | 33 | 35 |
| | Pencil hardness | B | 2B | HB | B | B | B | B | HB | B | 2B |
| | Water resistance | No change | No change | No change | No change | No change | No change | No change | No change | No change | No change |
| | Adhesion test | Good | Good | Good | Good | Good | Good | Good | Good | Good | Good |
| | Salt-spray resistance (mm) | 2.5 | 2.0 | 2.0 | 1.5 | 2.0 | 1.5 | 12.0 | 13.0 | 7.0 | 6.0 |

(*5): The aqueous resin composition containing a dryer in an amount of 0.05% by weight as metal based on the resin solids was coated on a polished mild steel sheet by a bar boater, and dried at a temperature of 20° C. and a relative humidity of 75% for 7 days.
The other properties were tested by the same methods as shown in the footnote to Table 1.

COMPARATIVE EXAMPLE 6

| | |
|---|---|
| Linseed oil fatty acid | 396 parts |
| Pentaerythritol | 140 parts |
| 1,4-Cyclohexane dimethanol | 144 parts |
| iso-Phthalic acid | 248 parts |
| Benzoic acid | 178 parts |
| Dibutyltin oxide | 2 parts |
| Xylene | 30 parts |

The above ingredients were put in a reactor, and reacted at 240° C. for 7 hours with stirring in an atmosphere of nitrogen, until the acid value of the resin reached 3.7. Thus, an alkyd resin having a hydroxyl value of 3.5 was obtained. The temperature was lowered to 200° C., and 25 parts of maleic anhydride was added. The alkyd resin was maleinized at 200° C. for 3 hours. After the reaction, the reaction mixture was distilled under reduced pressure to remove the unreacted maleic anhydride and xylene. The temperature was then lowered to 140° C. At this temperature, 15 parts of tap water was added to the reactor, and ring-opening reaction was performed for 1 hour. Then, 330 parts of n-butyl Cellosolve was added to give a maleinized alkyd resin varnish having a heating residue of 75%, a resin acid value of 27.8, a Gardner viscosity (as a 60% n-butyl Cellosolve solution) of Y and a number average molecular weight of 5,000.

The resulting varnish (213 parts), 3 parts of n-butyl Cellosolve, 8 parts of triethylamine, and 778 parts of tap water were well stirred to form a solution. To the solution was added a solution of 1 part of ammonium persulfate in 20 parts of tap water. Then, a mixture of 404 parts of n-butyl Cellosolve and 10 parts of 1,6-hexanediol dimethacrylate was added, and the resulting

What we claim is:

1. An aqueous resin composition comprising a neutralization product of an isocyanurate group-containing maleinized alkyd resin having an acid value of 5 to 65 in an aqueous medium, said maleinized alkyd resin being prepared by maleinizing an alkyd resin having an acid value of not more than 10 and a hydroxyl value of not more than 10 which is the product of condensation reaction of (A) 20 to 60% by weight of at least one of drying or semi-drying oils and fatty acids, (B) 10 to 45% by weight of at least one tris(hydroxyalkyl)isocyanurate, (C) 0 to 45% by weight of at least one polyhydric alcohol other than the component (B), (D) 10 to 45% by weight of at least one polybasic acid, and (E) 0 to 15% by weight of at least one monobasic acid.

2. The composition of claim 1 wherein the amount of the component (A) is 30 to 50% by weight.

3. The composition of claim 1 wherein the component (A) is selected from the group consisting of linseed oil, soybean oil, linseed oil fatty acid and soybean oil fatty acid.

4. The composition of claim 1 wherein the amount of the component (B) is 15 to 45% by weight.

5. The composition of claim 1 wherein the component (B) is selected from the group consisting of tris(2-hydroxyethyl)isocyanurate and tris(hydroxymethyl)isocyanurate.

6. The composition of claim 1 wherein the amount of the component (C) is 1 to 20% by weight.

7. The composition of claim 1 wherein the component (C) is an aliphatic polyhydric alcohol having 2 to 6 hydroxyl groups and 2 to 10 carbon atoms per molecule.

8. The composition of claim 1 wherein the component (C) is selected from the group consisting of 1,4-cyclohexane dimethanol, tricyclodecane methanol and pentaerythritol.

9. The composition of claim 1 wherein the amount of the component (D) is 15 to 30% by weight.

10. The composition of claim 1 wherein the component (D) is selected from aliphatic and aromatic polycarboxylic acids having 2 to 4 carboxyl groups and 6 to 10 carbon atoms per molecule.

11. The composition of claim 1 wherein the component (D) is selected from the group consisting of isophthalic acid and terephthalic acid.

12. The composition of claim 1 wherein the amount of the component (E) is 1 to 8% by weight.

13. The composition of claim 1 wherein the component (E) is selected from the group consisting of benzoic acid, p-tert-butyl-benzoic acid, methylbenzoic acid non-drying oil fatty acids.

14. The composition of claim 1 wherein the alkyd resin before maleinization has an acid value and a hydroxyl value both of not more than 7.

15. The composition of claim 1 wherein the components (A) to (E) are reacted in such proportions that the ratio of the total number of hydroxyl groups to that of carboxyl groups is from 1.10:1.0 to 1.0:1.10.

16. The composition of claim 15 wherein the ratio of the total number of hydroxyl groups to that of carboxyl groups is from 1.05:1.0 to 1.0:1.05.

17. The composition of claim 1 wherein the maleinized alkyd resin has an acid value of 10 to 50.

18. The composition of claim 1 wherein the maleinized alkyd resin has a number average molecular weight of about 800 to about 100,000.

19. The composition of claim 1 wherein the neutralization of the maleinized resin is effected by using ammonia or an amine.

20. The composition of claim 1 wherein the aqueous medium is selected from the group consisting of water and mixtures of water with water-miscible organic solvents.

21. The composition of claim 1 wherein the resin content is 5 to 60% by weight.

22. The composition of claim 1 which further comprises at least one type of additive selected from the group consisting of extender pigments, coloring pigments, dryers, rustproofing agents, ultraviolet absorbers and antifoamers.

23. An aqueous emulsion resin composition obtained by emulsion polymerization of a radical polymerizable unsaturated monomer in an aqueous medium in the presence of a neutralization product of an isocyanurate group-containing maleinized alkyd resin having an acid value of 6 to 65, said maleinized alkyd resin being prepared by maleinizing an alkyd resin having an acid value of not more than 10 and a hydroxyl value of not more than 10 which is the product of condensation reaction of (A) 20 to 60% by weight of at least one of drying or semidrying oils and fatty acids, (B) 10 to 45% by weight of at least one tris(hydroxyalkyl)isocyanurate, (C) 0 to 45% by weight of at least one polyhydric alcohol other than the component (B), (D) 10 to 45% by weight of at least one polybasic acid, and (E) 0 to 15% by weight of at least one monobasic acid.

24. The composition of claim 23 wherein the amount of the component (A) is 30 to 50% by weight.

25. The composition of claim 23 wherein the component (A) is selected from the group consisting of linseed oil, soybean oil, linseed oil fatty acid and soybean oil fatty acid.

26. The composition of claim 23 wherein the amount of the component (B) is 15 to 45% by weight.

27. The composition of claim 23 wherein the component (B) is selected from the group consisting of tris(2-hydroxyethyl)isocyanurate and tris(hydroxymethyl)isocyanurate.

28. The composition of claim 23 wherein the amount of the component (C) is 1 to 20% by weight.

29. The composition of claim 23 wherein the component (C) is an aliphatic polyhydric alcohol having 2 to 6 hydroxyl groups and 2 to 10 carbon atoms per molecule.

30. The composition of claim 23 wherein the component (C) is selected from the group consisting of 1,4-cyclohexane dimethanol, tricyclodecane methanol and pentaerythritol.

31. The composition of claim 23 wherein the mount of the component (D) is 15 to 30% by weight.

32. The composition of claim 23 wherein the component (D) is selected from aliphatic and aromatic polycarboxylic acids having 2 to 4 carboxyl groups and 6 to 10 carbon atoms per molecule.

33. The composition of claim 23 wherein the component (D) is selected from the group consisting of isophthalic acid and terephthalic acid.

34. The composition of claim 23 wherein the amount of the component (E) is 1 to 8% by weight.

35. The composition of claim 23 wherein the component (E) is selected from the group consisting of benzoic acid, p-tert-butyl-benzoic acid, methylbenzoic acid and non-drying oil fatty acids.

36. The composition of claim 23 wherein the alkyd resin before maleinization has an acid value and a hydroxyl value both of not more than 7.

37. The composition of claim 23 wherein the components (A) to (E) are reacted in such proportions that the ratio of the total number of hydroxyl groups to that of carboxyl groups is from 1.10:1.0 to 1.0:1.10.

38. The composition of claim 37 wherein the ratio of the total number of hydroxyl groups to that of carboxyl groups is from 1.05:1.0 to 1.0:1.05.

39. The composition of claim 23 wherein the maleinized alkyd resin has an acid value of 10 to 50.

40. The composition of claim 23 wherein the maleinized alkyd resin has a number average molecular weight of about 800 to about 100,000.

41. The composition of claim 23 wherein the neutralization of the maleinized resin is effected by using ammonia or an amine.

42. The composition of claim 23 wherein the aqueous medium is selected from the group consisting of water and mixtures of water with water-miscible organic solvents.

43. The composition of claim 23 wherein the radical polymerizable unsaturated monomer has a Q value, determined by the Q-e theory, of at least 0.1.

44. The composition of claim 23 wherein the radical polymerizable monomer unsaturated is selected from the group consisting of vinyl aromatic compounds, acrylic acid esters and methacrylic acid esters.

45. The composition of claim 44 wherein the radical polymerizable unsaturated monomer is selected from the group consisting of styrene, α-methylstyrene, vinyltoluene, $C_{1-12}$ alkyl esters of acrylic acid and $C_{1-12}$ alkyl esters of methacrylic acid.

46. The composition of claim 23 wherein at least a part of the radical polymerizable unsaturated monomer is replaced by a polyfunctional unsaturated monomer.

47. The composition of claim 23 wherein the weight ratio of the isocyanurate group-containing maleinized alkyd resin to the radical polymerizable unsaturated monomer is from 5:100 to 100:5.

48. The composition of claim 23 wherein the resin content is 5 to 50% by weight.

49. The composition of claim 23 which further comprises at least one type of additive selected from the group consisting of extenderpigments, coloring pigments, dryers, rustproofing agents, ultraviolet absorbers, and antifoamers.

* * * * *